(12) United States Patent
Vijeh et al.

(10) Patent No.: US 7,792,023 B2
(45) Date of Patent: *Sep. 7, 2010

(54) PER-FLOW RATE CONTROL FOR AN ASYNCHRONOUS METRO PACKET TRANSPORT RING

(75) Inventors: Nader Vijeh, Sunnyvale, CA (US); Adisak Mekkittikul, Mountain View, CA (US)

(73) Assignee: ARRIS Group, Suwznee, GA (US)

(*) Notice: Subject to any disclaimer, the term of this patent is extended or adjusted under 35 U.S.C. 154(b) by 1762 days.

This patent is subject to a terminal disclaimer.

(21) Appl. No.: 10/846,297

(22) Filed: May 13, 2004

(65) Prior Publication Data

US 2005/0002392 A1 Jan. 6, 2005

(51) Int. Cl.
H04L 12/26 (2006.01)
H04L 12/28 (2006.01)
H04L 12/56 (2006.01)

(52) U.S. Cl. .................. 370/230; 370/235; 370/258; 370/406

(58) Field of Classification Search .................. None
See application file for complete search history.

(56) References Cited

U.S. PATENT DOCUMENTS

| | | | | |
|---|---|---|---|---|
| 5,864,415 A | * | 1/1999 | Williams et al. | 398/72 |
| 5,959,994 A | * | 9/1999 | Boggs et al. | 370/399 |
| 6,041,056 A | * | 3/2000 | Bigham et al. | 370/395.64 |
| 6,097,719 A | * | 8/2000 | Benash et al. | 370/352 |
| 6,118,776 A | * | 9/2000 | Berman | 370/351 |
| 6,154,462 A | * | 11/2000 | Coden | 370/403 |

\* cited by examiner

*Primary Examiner*—Chi H Pham
*Assistant Examiner*—Soon-Dong D Hyun
(74) *Attorney, Agent, or Firm*—FSP LLC (57) ABSTRACT

An asynchronous metropolitan packet transport ring having per-flow QoS. Asynchronous packetized data flow in one direction through a fiber optic loop. A number of Metropolitan Packet Switches (MPS) are coupled to the fiber optic loop. An MPS allows packetized data from an upstream MPS to flow to a downstream MPS over a segment of the fiber optic loop. The MPS also puts packetized data onto and pulls packetized data off of the fiber optic loop. Thereby, flows can access the fiber optic loop via the MPS's. The MPS's also regulate the data rates on a per-flow basis according to setup information supplied by a Ring Management System (RMS). If one segment of the fiber loop becomes overly congested, the MPS guarantees quality of service for those flows by deallocating available bandwidth from flows upstream to the point of congestion. Utilization of packet transport ring capacity is optimized by allocating any bandwidth that becomes available to active flows according to a pre-specified weighting scheme.

26 Claims, 6 Drawing Sheets

PER-FLOW RATE CONTROL FOR AN ASYNCHRONOUS METRO PACKET TRANSPORT RING

FIELD OF THE INVENTION

The present invention relates to an apparatus and method for the per-flow rate control of asynchronous data packets flowing in a metro packet transport ring.

BACKGROUND OF THE INVENTION

The Internet is a general purpose, public computer network which allows millions of computers all over the world, hooked into the Internet, to communicate and exchange digital data with other computers also coupled to the Internet. Once a computer is coupled to the Internet, a wide variety of options become available. Some of the myriad functions possible over the Internet include sending and receiving electronic mail (e-mail) messages, browsing different web sites, downloading and/or uploading files, etc. In the past, activities over the Internet were limited due to the relatively slow connection speeds of dial-up modems over conventional telephone lines.

However, as new technologies emerge, the speed at which one can connect onto the Internet is ever increasing. Now, users on the Internet have the bandwidth to participate in live discussions in chat rooms, play games in real-time, watch streaming video, listen to music, shop and trade on-line, etc. In the future, it is imagined that the bandwidth will be such that video-on-demand, HDTV, IP telephony, video teleconferencing, and other types of bandwidth intensive applications will soon be possible.

Indeed, telecommunications companies are now laying the foundation to dramatically increase the bandwidth of the Internet backbone. Significant upgrades are being made to the routing, networking, and cabling infrastructure to keep up with the explosion in Internet traffic. One approach by which bandwidth is being increased relates to fiber optics technology. By sending pulses of light through glass fibers no thicker than a human hair, vast amounts of digital data can be transmitted at extremely high speeds. And with the advent of dense wavelength division multiplexing, different wavelengths of light can be channeled over the same, single fiber strand, thereby increasing its capacity several fold.

However, there is a problem with distributing the bandwidth of this new fiber optic network to end users. Essentially, this next-generation information superhighway has no real, effective entrance or exit ramps. Presently, service providers are using traditional local area network (LAN) switches and routers manufactured by companies such as Cisco, Nortel, and Lucent to perform the function of packet routing. Digital data is packetized; when a packet is transmitted by a user, that packet is examined and routed to its destination according to its IP address contained within that packet.

Although this process is standard and well-accepted, it suffers from several drawbacks. Namely, packets are transmitted asynchronously and sent best effort through the Internet. Due to traffic congestion, network overhead, routing conditions, and other uncontrollable external factors, this process is highly unreliable and unpredictable. Basically, packets vie for available bandwidth and are routed according to a best-effort delivery model. As such, the reliability of traditional LAN switches and routers is limited. Consequently, it is virtually impossible to provide any kind of quality of service (QoS) using traditional LAN switches and routers. QoS refers to the guarantee of providing timely delivery of information, controlling bandwidth per user, and setting priorities for select traffic. For real-time applications such as video on demand, HDTV, voice communications, etc., dropped packets or late-arriving packets can seriously disrupt or even destroy performance. And for many Internet Service Providers (ISP's), Applications Service Providers (ASP's), web sites/portals, and businesses, it is of paramount importance that they have the ability to provide a certain minimum threshold bandwidth. For example, a e-commerce or business web site may lose critical revenue from lost sales due to customers not being able to access their site during peak hours.

Because QoS is so highly desired by users, there exists mechanisms which have been developed to provide QoS functionality. However, these mechanisms are all extremely expensive to implement. One mechanism is commonly referred to as T-carrier services (e.g., T1 line for carrying data at 1.544 Mbits/sec. and T3 line for carrying data at a much faster rate of 44.736 Mbits/sec.). These T1 and T3 lines are dedicated point-to-point data links leased out by the telephone companies. The telephone companies typically charge long distance rates (e.g., $1,500-$20,000 per month) for leasing out a plain old T1 line. Another commonly used mechanism for achieving QoS relates to Synchronous Optical Network (SONET). As with T-carrier services, SONET uses time division multiplexing (TDM) to assign individual channels to pre-determined time slots. With TDM, each channel is guaranteed its own specific time slot in which it can transmit its data. Although TDM enables QoS, it is costly to implement because both the transmitter and receiver must be synchronized at all times. The circuits and overhead associated with maintaining this precise synchronization is costly. Furthermore, TDM based networking technologies are highly inefficient in that if a user does not transmit data within his dedicated time slot, that time slot goes empty and is wasted. In other words, TDM employs a use-it-or-lose-it approach whereby unused bandwidth is totally wasted; unused bandwidth cannot be reallocated to a different user.

Although the Internet backbone is being substantially overhauled to substantially increase its bandwidth, there is no mechanism in place today for distributing this bandwidth to end users that is cost-efficient, effective and yet which also has the ability of providing rate control on a per-flow basis. The present invention provides a solution to this networking need.

SUMMARY OF THE INVENTION

The present invention pertains to a metropolitan packet transport ring (MPTR). The MPTR is comprised of a fiber optic loop through which packetized data flow asynchronously in one direction. Because the packetized data flows asynchronously through the fiber optic loop, the present invention eliminates the need to maintain a strict synchronization scheme, implement expensive synchronization circuits, and incur the processing overhead associated with traditional TDM mechanisms. In another embodiment, data flows asynchronously through two separate fiber optic loops. Data flows clockwise through one loop and counter-clockwise through the second loop.

Coupled to this fiber optic loop are a number of metropolitan packet switches (MPS's). An MPS allows packetized data from an upstream MPS to flow through downstream. The MPS also puts packetized data onto and pulls packetized data off of the fiber optic loop. Thereby, computing and networking devices such as personal computers, servers, modems, set-top boxes, routers, etc., can access the fiber optic loop via the MPS's.

It is also the responsibility of the MPS to separately regulate the data rates that each flow is allowed to transmit packetized data onto the fiber loop. This enables the MPS to provide quality of service (QoS) to certain subscribers on a per-flow basis. The MPS monitors the traffic flowing in its particular segment of the network. If its segment becomes overly congested, the MPS reduces the data rates corresponding to flows of upstream MPS's. The data rates of the QoS flows are left intact, which guarantees that those paying subscribers can maintain a constant bit rate service, a variable bit rate service with a minimum floor bandwidth, or a service level agreement. Thereby, the present invention guarantees QoS in an asynchronous packetized data environment on a per-flow basis.

Furthermore, if bandwidth does become available due to a temporary lull in traffic, the unused bandwidth can be allocated by the MPS. The MPS transmits control packets to upstream MPS's informing them that they can increase their data rates on selected flows according to some pre-specified weighting scheme. This ensures that the total bandwidth of the MPTR is utilized as efficiently as possible with minimal wasted bandwidth.

A ring management system (RMS) is used to perform the initial bandwidth allocation. Bandwidth is allocated on a per-flow basis. In one embodiment of the present invention, the data rate can be adjusted on a per-flow basis. A device, user, or port can have multiple flows.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

An asynchronous metro packet transport ring network is described. In the following description, for purposes of explanation, numerous specific details are set forth in order to provide a thorough understanding of the present invention. It will be obvious, however, to one skilled in the art that the present invention may be practiced without these specific details. In other instances, well-known structures and devices are shown in block diagram form in order to avoid obscuring the present invention.

Figure 1:
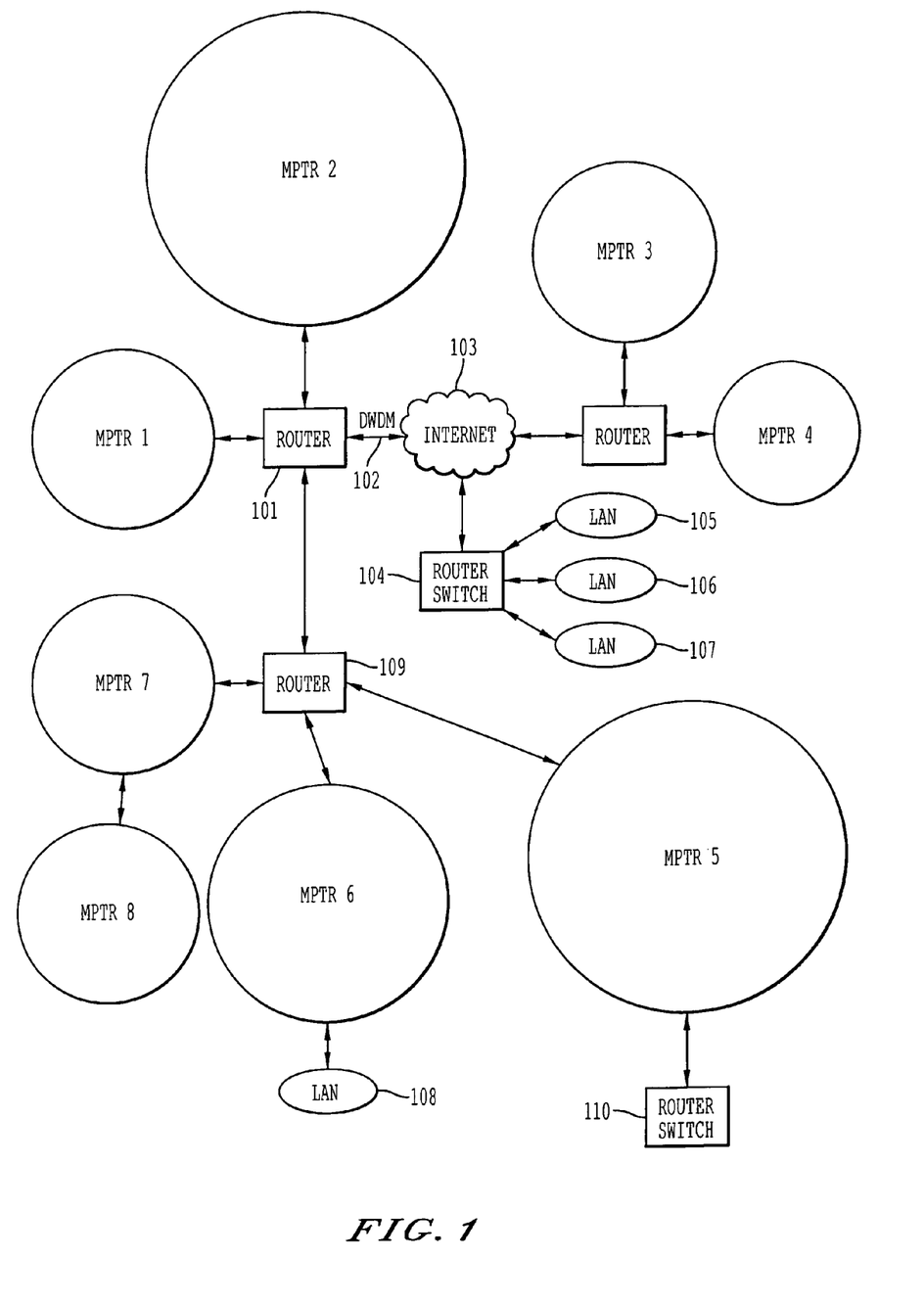
FIG. 1 shows the overall architecture of the asynchronous metro packet transport ring network according to the currently preferred embodiment of the present invention.

FIG. 1 shows the overall architecture of the asynchronous metro packet transport ring network according to the currently preferred embodiment of the present invention. A metropolitan packet transport ring (MPTR) consists of a loop which is laid to transmit data packets in a metropolitan area network (MAN). A MAN is a backbone network which spans a geographical metropolitan area. Typically, telephone companies, cable companies, and other telecommunications providers supply MAN services to other companies, businesses, and users who need access to networks spanning public rights-of-way in metropolitan areas. In the currently preferred embodiment, the loops consist of installed fiber optic cables. Other less efficient transmission mediums such as hybrid fiber coax, coax cables, copper wiring, or even wireless (radio frequency or over-the-air laser beams) can be used or substituted in part thereof.

Users coupled to a particular MPTR can transmit and receive packetized data to/from each other through that MPTR. For example, a personal computer coupled to MPTR1 can transmit and received data packets to/from a server also coupled to MPTR1. Furthermore, data packets originating from one MPTR can be routed to another MPTR by means of a router or other networking devices. For example, a computer coupled to MPTR1 can transmit data packets over its fiber ring to a terra-bit router 101 to MPTR2. The data packets can then be sent to its final destination (e.g., a computer coupled to MPTR2) through the fiber ring associated with MPTR2. It should be noted that the MPTR rings can be of various sizes and configurations. Although the currently preferred embodiment contemplates the use of a ring, the present invention can also utilize other types of topologies. The MPTRs can also be coupled onto the Internet backbone via a router. For example, MPTR1 can be coupled to a dense wavelength division multiplexed (DWDM) fiber backbone 102 by means of router 101. Thereby, users coupled to MPTR1 has access to the resources available on traditional Internet 103. Note that the present invention can be used in conjunction with traditional Internet schemes employing standard routers, switches, and other LAN equipment 104-107. And any number of MPTR's can thusly be coupled together to gracefully and cost-effectively scale to meet the most stringent networking demands which may arise. And as one particular loop becomes overloaded, a second, third, forth, etc. MPTR may be added to accommodate the increased load. These MPTR's can be coupled to the same router (e.g., MPTR5, MPTR6, and MPTR7) or may alternatively be coupled to different routers.

Not only does the present architecture scale gracefully, it also offers great flexibility. In one embodiment, an MPTR can be used to support one or more LANs. For instance, MPTR6 may support traffic flowing to/from LAN 108. Optionally, it is conceivable that an MPTR may be coupled directly to another MPTR. In this manner, data flowing in MPTR8 can be directly exchanged with data packets flowing through MPTR7. Alternatively, a single MPTR can have multiple entries/exits. For example, MPTR5 is coupled to both router 109 as well as router/switch 110. Thereby, users on MPTR5 have the ability to transmit and receive data packets through either of the two routers 109 or 110. Virtually any configuration, protocol, medium, and topology is made possible with the present MPTR invention.

Figure 2:
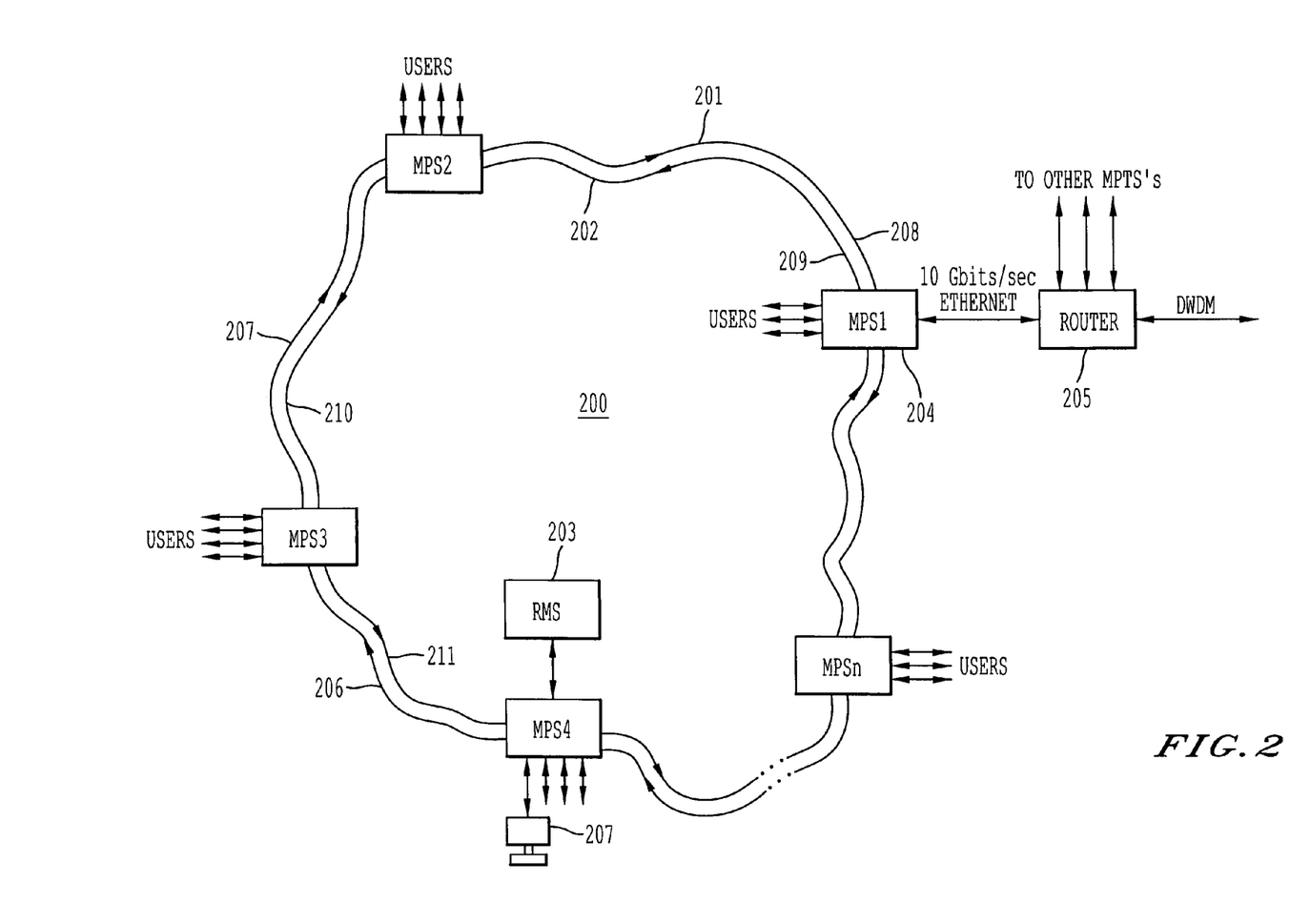
FIG. 2 shows an exemplary Metro Packet Transport Ring.

The implementation and functionality of an MPTR is now described. Referring to FIG. 2, an exemplary Metro Packet Transport Ring 200 is shown. It can be seen that MPTR 200 is comprised of two fiber cable loops 201 and 202; a number of Metro Packet Switches (MPS1-MPSn); and a Ring Management System (RMS) 203. The physical layer of an MPTR is actually comprised of two redundant fiber cable loops 201 and 202. Data packets flow in opposite directions through the two loops (e.g., clockwise in loop 201 and counter-clockwise in loop 202). Dispersed along the fiber loops 201 and 202 are a number of Metro Packet Switches (MPS's). An MPS is coupled to both of the fiber loops 201 and 202, providing redundancy to the network. Thereby, if there is a break in one segment of the fiber loop, data can be redirected through one of the MPS's to flow through the other, operational fiber loop. Alternatively, traffic can be re-directed to minimize localized congestion occurring in either of the loops.

In the currently preferred embodiment, each MPTR can support up to 254 MPS's. An MPS is a piece of equipment which can be housed in specially designed environmental structures or it can be located in wiring closets or it can reside at a place of business, etc. The distances between MPS's can be variable. It is through an MPS that each individual end user gains access to the fiber loops 201 and 202. Each individual end user transmits packetized data onto the MPS first. The MPS then schedules how that packetized data is put on the fiber loop. Likewise, packetized data are first pulled off a fiber loop by the MPS before being sent to the recipient end user coupled to the MPS. In the currently preferred embodiment, a single MPS can support up to 128 end users. An end user can be added to an MPS by inserting a line interface card into that particular MPS. The line interface cards provide I/O ports through which data can be transferred between the MPS and its end users. Different line interface cards are designed in order to meet the particular protocol corresponding to that particular end user. Some of the protocols supported include T1, T3, SONET, Asynchronous Transfer Mode (ATM), digital subscriber line (DSL), Ethernet, etc. It should be noted that line interface cards can be designed to meet the specifications of future protocols. In this manner, end users such as mainframe computers, workstations, servers, personal computers, set-top boxes, terminals, digital appliances, TV consoles, routers, switches, hubs, and other computing/processing devices, can gain access to either of the fiber loops 201 and 202 through an MPS.

Not only does an MPS provide I/O ports to end users, but an MPS also provides a means for inputting packetized data into the MPTR and also for outputting packetized data out from the MPTR. For example, data packets are input to MPTR 200 via MPS 204 which is coupled to router 205. Similarly, data packets are output from MPTR 200 via MPS 204 to router 205.

Another function of an MPS entails passing along incoming data packets originating from an upstream MPS to the next downstream MPS. An MPS receives upstream data packets forwarded from an upstream MPS via an input fiber port coupled to the fiber loop. Data packets received from the fiber loop are examined by that MPS. If the data packet is destined for an end user coupled to that particular MPS, the data packet is routed to the appropriate I/O port. Otherwise, the MPS immediately forwards that data packet to the next downstream MPS as quickly as possible. The data packet is output from the MPS by an output fiber port onto the fiber loop. It should be noted that such pass-through packets flowing from an upstream fiber loop segment, through the MPS, and onto a downstream fiber loop segment, always takes priority over packets waiting to be inserted onto the fiber loop by the MPS. In other words, the MPS puts data packets generated by its end users only as bandwidth permits.

An example is now offered to show how data packets flow in an MPTR. With reference to FIG. 2, a computer 207 coupled to MPS4 can transmit and receive data to/from the Internet as follows. Data packets generated by the computer are first transmitted to MPS4 via a line coupled to a line interface card residing within MPS4. These data packets are then sent on to MPS3 by MPS4 via loop segment 206. MPS3 examines the data packets and passes the data packets downstream to MPS2 via loop segment 207; MPS2 examines the data packets and passes the data packets downstream to MPS1 via loop segment 208. Based on the addresses contained in the data packets, MPS1 knows to output theses data packets on to the I/O port corresponding to router 205. It can be seen that MPS1 is connected to a router 205. Router 205 routes data packets to/from MPTR 200, other MPTR's, and the Internet backbone. In this case, the data packets are then routed over the Internet to their final destination. Similarly, data packets from the Internet are routed by router 205 to MPTR 200 via MPS1. The incoming data packets are then examined and forwarded from MPS1 to MPS2 via loop segment 209; examined and forwarded from MPS2 to MPS3 via loop segment 210; and examined and forwarded from MPS3 to MPS4 via loop segment 211. MPS4 examines these data packets and determines that they are destined for computer 207, whereby MPS4 outputs the data packets through its I/O port corresponding to computer 207.

Likewise, users coupled to any of the MPS's can transmit and receive packets from any other MPS on the same MPTR without having to leave the loop. For instance, a user on MPS2 can transmit data packets to a user on MPS4 by first transmitting the packets into MPS2; sending the packets from MPS2 to MPS3 over loop segment 207; MPS3 sending the packets to MPS4 over loop 202; and MPS4 outputting them on the appropriate port corresponding to the intended recipient.

Although different protocols are supported by the present invention, the currently preferred embodiment utilizes a single protocol from origination to its final destination. Since most computers have adopted Ethernet network interface cards, the present invention transmits Ethernet data packets through as much of the networking scheme as possible. For example, a computer transmits Ethernet packets to its MPS. These Ethernet packets are carried through the fiber loop which consists of 10 Gbit Ethernet physical layer. Each loop can have a circumference of up to 150 kilometers. The MPTR is connected to an external router by means of one or more 10 Gbit Ethernet lines (e.g., fiber cable). The external router is connected to one or more DWDM Gigabit Ethernet fiber cables which is connected at the other end to another router. This other router is connected to a destination MPTR via another 10 Gbit Ethernet line. The MPTR has 10 Gbit Ethernet loops. The Ethernet packets are then sent through the loop to its intended destination as Ethernet. As such, data originates as Ethernet packets, are routed through the various physical mediums as Ethernet packets, and are received by the recipient as Ethernet. With the present invention, there is no need to convert data to different formats or protocols and then subsequently reconvert the data back. Because the present invention saves on the associated processing overhead, data can be sent faster and more economically.

Figure 3:
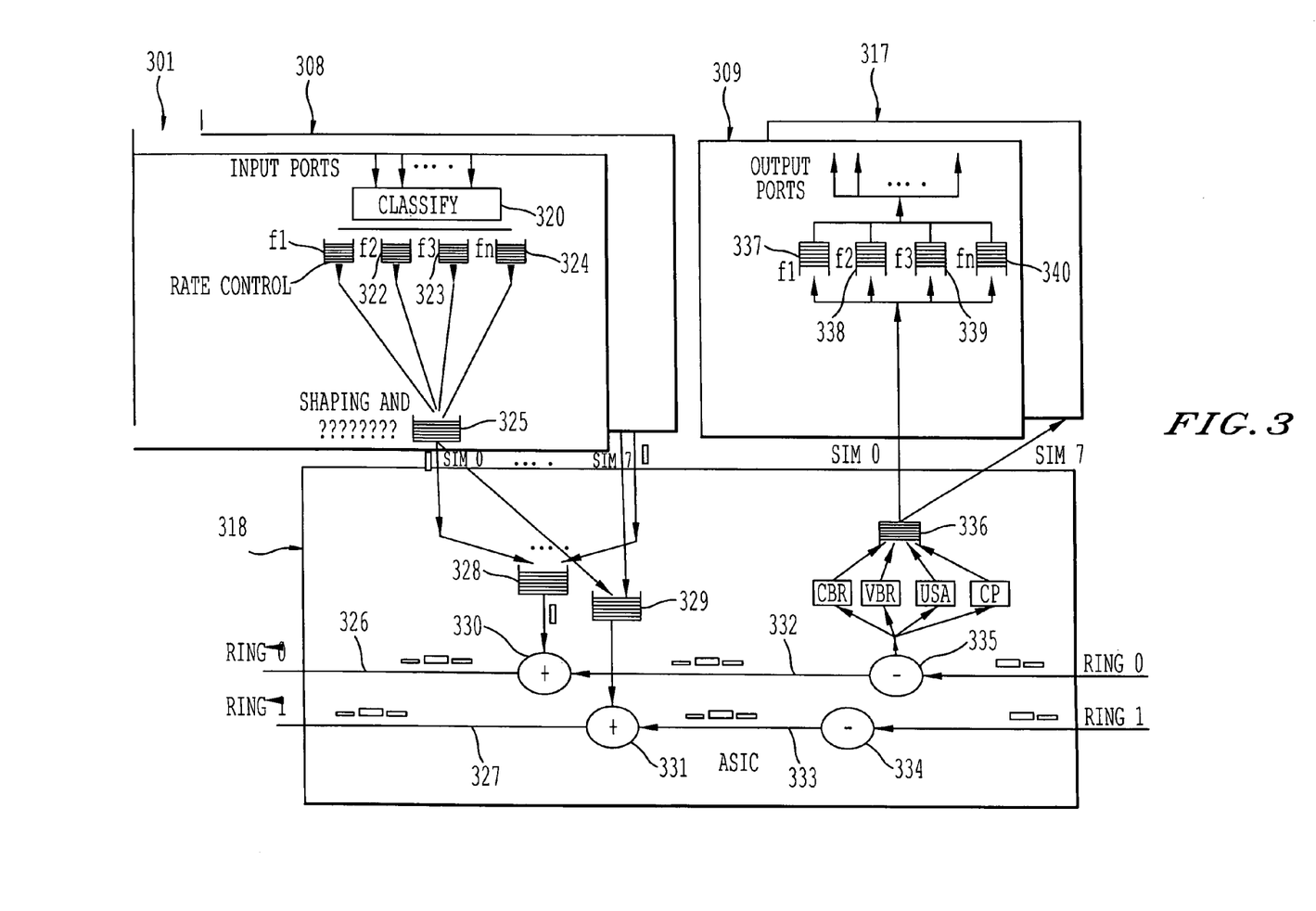
FIG. 3 shows the block diagram of the currently preferred embodiment of an MPS.

FIG. 3 shows the block diagram of the currently preferred embodiment of an MPS. The MPS is comprised of a number of input port modules 301-308 and output port modules 309-317 coupled to an application specific integrated circuit (ASIC) 318. An input port module accepts a number of incoming flows and classifies each flow per classifier circuit 320. Each flow has its own buffer (e.g., buffers 321-324) for queuing the data associated with each flow. Each buffer has an associated rate controller which varies the rate of the flow coming out from that particular buffer. The rate is controlled on a per-flow basis. After rate control, the data output from each of the buffers are then collectively stored in another buffer 325 which is used to perform the functions of rate shaping and queuing. The data is then eventually output from buffer 325 to either of the two fiber loops 326 or 327. Buffer 328 is used to collate all the data originating from the input modules 301-308. An inserter 330 inserts the data output from buffer 328 with the upstream data on segment 332. Consequently, flows from the input port modules 301-308 are inserted and sent downstream on fiber loop 326. Likewise, buffer 329 collates all the data output from the input modules 301-308. Inserter 331 inserts the data from buffer 329 with the upstream data on segment 333. Consequently, flows from the input port modules 301-308 are inserted and sent downstream on fiber loop 327.

The MPS examines each data packet incoming on fiber loops 326 and 327. If a particular data packet is destined to one of the output ports associated with the MPS, then that data packet is pulled out from the fiber loop. Removal circuit 334 removes appropriate data packets from fiber loop 327, and removal circuit 335 removes appropriate data packets from fiber loop 326. Buffer 336 sends the data packets pulled from the fiber loops 326 and 327 to the appropriate output port modules 309-317. Once an output module accepts a data packet, that data packet is queued in one of the buffers 337-340. Data packets are output from the data output modules on a per-flow basis.

In the currently preferred embodiment, the traffic flowing into, out of, and through an MPTR is managed collectively by all the MPS's of that particular MPTR. Basically, an MPS provides QoS for those specific users coupled to the MPTR desiring QoS services. Thereby, the present invention can guarantee constant bit rate services, variable bit rate services with a minimal floor bandwidth, as well as tailored service level agreements. The MPS's also aggressively allocate unused bandwidth amongst active flows on the MPTR according to a weighted allocation scheme. Thereby, the entire bandwidth of the MPTR is efficiently utilized at all times.

The way by which QoS is achieved by an MPS is now described. In the present invention, data packets are transmitted and received over the MPTR asynchronously. In other words, users transmit and receive data packets without being synchronized with their counterparts. This means that the present invention eliminates the need for implementing expensive timing circuits and adhering to strict synchronization schedules. Instead of using synchronization or TDM to achieve QoS, the present invention provides QoS by regulating which packets from an MPS are allowed onto a loop and regulating the rate at which these packets are allowed to be put onto a loop. Once data packets are put on the loop, they are sent through the loop at maximum speed. Given that a loop has a maximum bandwidth, users are prioritized according to their QoS level such that the packets from users with higher priority get put on the loop ahead of other users' packets. Suppose that there is one user who pays for a higher level of service. The MPS is programmed by the RMS to give higher priority to that specific user. Thereby, all packets transmitted by that particular user are immediately put onto the loop and sent on their way. If the loop happens to be congested at that particular instant, packets from other users are temporarily stored in a small buffer and transmitted at a later time, as bandwidth permits. In other words, lower priority packets are temporarily held up by the MPS to be transmitted at a later time as bandwidth becomes available.

Furthermore, because data packets are transmitted asynchronously through the MPTR, unused bandwidth can be allocated to active users. In a TDM scheme, time slots are reserved for specific users. If a particular time slot is not used because its user is not active at that particular instant in time, the time slot is wasted. In contrast, the present invention allocates virtually the entire bandwidth of a loop to existing, active users. When a flow stops transmitting/receiving data packets, the amount of bandwidth available over the loop increases. This available bandwidth can be assigned to other flows which are currently active on that loop by the MPS. The MPS constantly monitors the congestion on its loop segment and assigns unused bandwidth to be allocated amongst active upstream flows according to a pre-specified weighted scheme. Thereby, with the present invention, the entire bandwidth for each of the loops is most efficiently utilized all the time.

Figure 4:
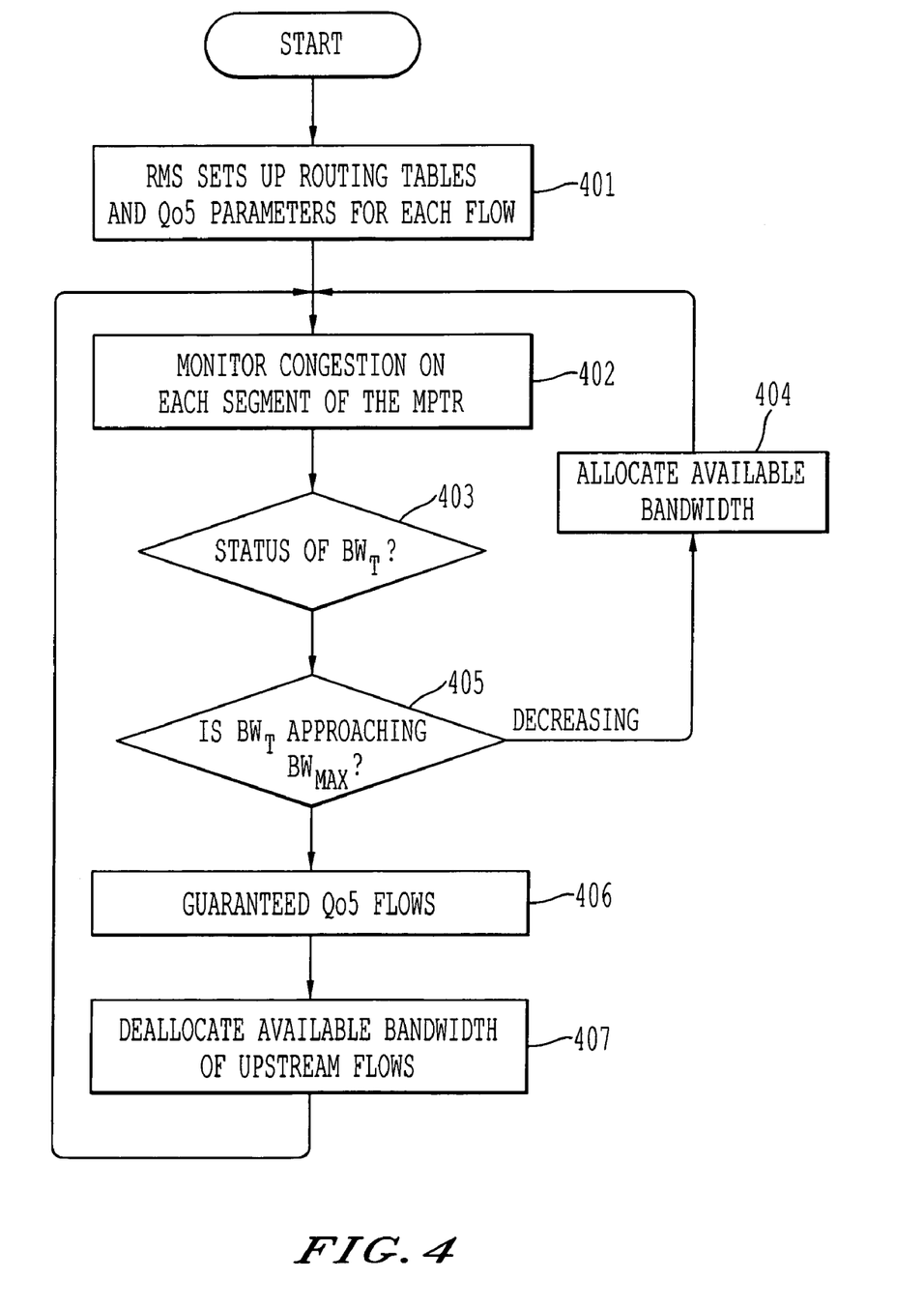
FIG. 4 is a flowchart describing the process by which bandwidth is managed in an MPTR.

FIG. 4 is a flowchart describing the process by which bandwidth is managed in an MPTR. A loop has a known, fixed maximum bandwidth capacity ($BW_{max}$). In the present invention, the RMS initially sets up the routing tables for each flow of each of the MPS's on the MPTR, step 401. The routing tables specify flow criteria, especially the QoS parameters for each flow. For instance, a flow can have a specific minimum bandwidth or a constant bandwidth or a best-effort bandwidth, etc. The RMS also ensures that the bandwidth allocated does not exceed the maximum bandwidth capacity of the MPTR. Before a new flow is allowed to be added onto the MPTR, the RMS checks its tables to determine whether there is enough bandwidth on the MPTR to support the new flow. If there is enough bandwidth, the MPS corresponding to that flow has its table updated to reflect that new flow. However, if there is a possibility that the maximum bandwidth capacity might be exceeded, then the new flow is prevented from being added, and a warning message is displayed.

Once all the routing tables have been configured, the traffic on each segment of the MPTR is continuously monitored, step 402. The congestion ($BW_T$) for a segment is calculated by summing all the upstream transmissions flowing through that particular segment. The congestion for any segment is continuously changing, depending on the flow activities. As the congestion varies over time, a determination is made as to whether the congestion is increasing or decreasing per step 403. If the congestion is decreasing, the extra bandwidth that becomes available is allocated to upstream flows, step 404. If there is enough bandwidth to meet all active flows needs, then the flows are allowed to access the loop at their maximum transmission rates. There may be circumstances whereby all active flows have reached their maximum rate of transmission and yet not consume all the available bandwidth on a loop segment. Otherwise, the available bandwidth is allocated according to some pre-specified weighting scheme on a per-flow basis.

But if it is determined that the congestion ($BW_T$) is actually increasing, a determination is made as to whether the congestion ($BW_T$) is approaching that segment's maximum bandwidth capacity ($BW_{max}$), step 405. If the maximum bandwidth capacity is not about to be exceeded, then all active flows contributing to the traffic flowing through that particular segment is permitted to transmit at their current rate. However, if the congestion starts to approach the maximum bandwidth capacity (e.g., comes within three or four percent), then the bandwidth for all flows contributing to the traffic through that particular segment is allocated as follows. Those flows having QoS take priority over all other flows, step 406. Accordingly, the QoS flows are guaranteed to have their paid-for portion of the bandwidth. This means that the available bandwidth of upstream flows must be deallocated, step 407. The available bandwidth of flows upstream to the point of congestion is deallocated to a degree such that all QoS users having traffic which flows through that segment are guaranteed their subscribed level of service and the total congestion through that segment does not exceed a certain percentage of the maximum bandwidth capacity. The available bandwidth for upstream flows are deallocated according to a pre-specified weighting function. It should be noted, that there may be instances where some flows will have dropped packets in order to guarantee the bandwidth requirements of QoS subscribers.

Figure 5:
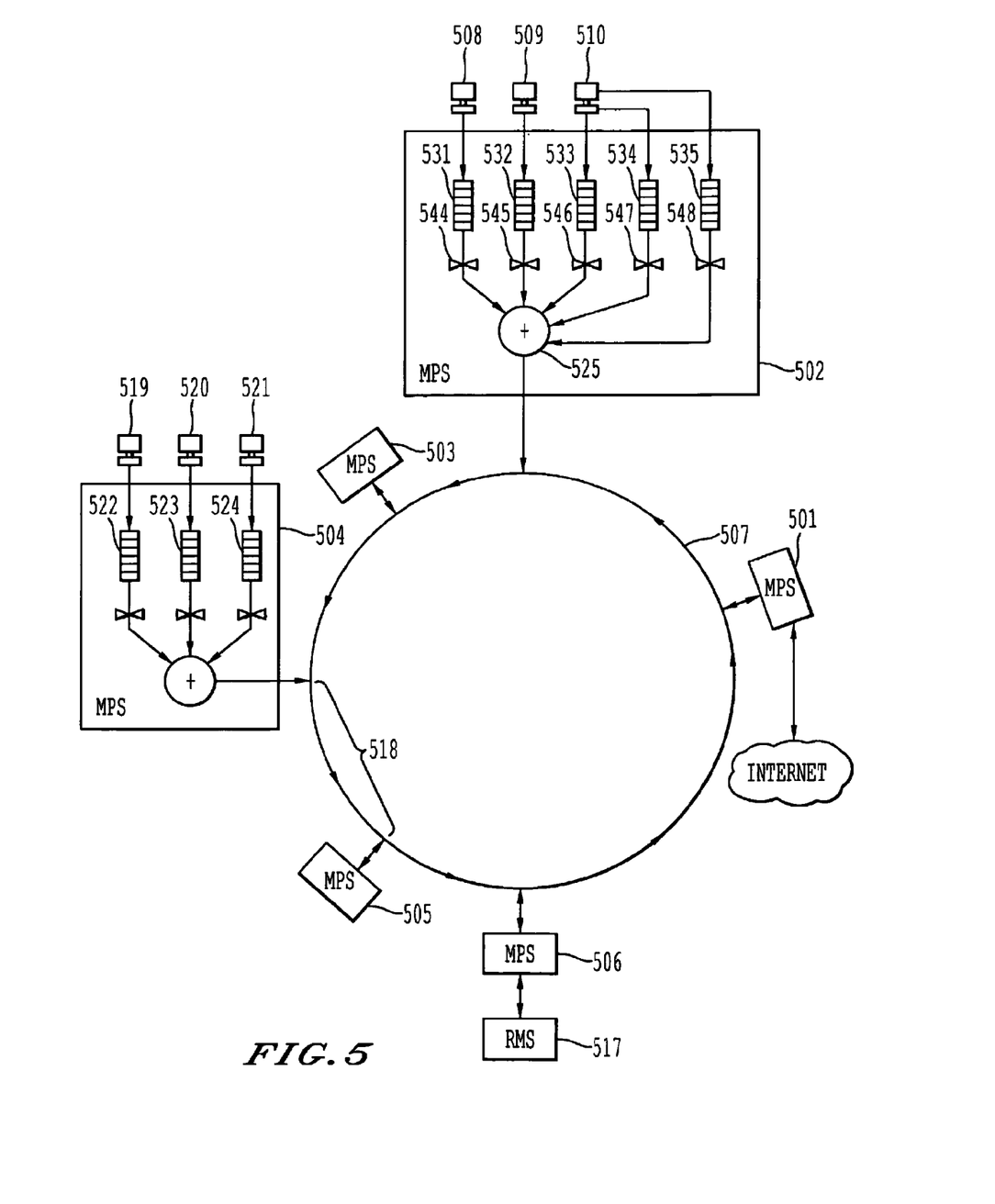
FIG. 5 shows an exemplary flow diagram for an MPTR

FIG. 5 shows an exemplary flow diagram for an MPTR. A number of MPS's 501-506 are shown coupled to a fiber loop 507. Two of the MPS's 502 and 503 have been shown in greater detail to depict how data flows in an MPTR. A number of computers 508-510 are shown coupled to MPS 502. Each of these computers 508-510 has a corresponding buffer 531-535. These buffers 531-535 are used to temporarily store incoming data packets from their respective computers 508-510. In the currently preferred embodiment, there is one buffer for each flow. A single device (e.g., personal computer, server, modem, set-top box, terminal, etc.) can have multiple flows. A flow can be an application corresponding to a device. As such a single device can have multiple flows. For example, computer 510 can have three flows 533-535. Associated with each of these buffers 531-535 is a respective controller 544-548 which controls when packets queued in that particular buffer are allowed to be transmitted onto the loop 507. Once a packet is allowed to be transmitted out from MPS 502, it is inserted into an inserter 525 and added with the other outbound packets for that cycle. And when a packet is conveyed from an MPS onto loop 507, that packet is transmitted to its destination at the maximum rate of loop 507 and immediately forwarded through intermediary MPS's (if any).

The present invention has the capability to control the data rates on a per-flow basis. For instance, suppose that the flow associated with buffer 533 is that of an e-mail application; the flow associated with buffer 534 is a web browser application; and the flow associated with buffer 535 is an HDTV application. The data rates for each of these three flows can be set by the RMS 517 and regulated separately by adjusting their respective controllers 546-548. The e-mail flow may have a best-effort rate because e-mail is generally not time critical. The browser flow may have a minimum bandwidth rate for web surfing purposes. And the HDTV flow may have a constant bit rate for downloading and viewing streaming videos on demand. By having the ability to control the data rates for each individual flow, the present invention enables great flexibility to meet the demands across all spectrums of usage.

To illustrate how QoS service is provided by the present invention, assume that the user on computer 508 pays for a QoS level which guarantees him a minimum bandwidth of 100 Mbps. Now, suppose that the traffic from MPS's 501, 502, 503, and 504 are such that loop segment 518 becomes heavily congested. The MPS 505 immediately recognizes that loop segment 518 is congested because it knows the data rates of each port on each of the MPS's 501-504 transmitting over loop 507. If the sum of the rates generated by each port of MPS's 501-504 starts to approach the maximum bandwidth capacity of loop segment 518, then MPS 505 instructs one or more of the flows other than the one corresponding to computer 508 to slow down their data rates. For example, MPS 505 can send control packets to MPS 504 to decrease the data rates of the flows associated with computers 519-521. The data rates associated with other ports are decreased until enough bandwidth becomes available so that the computer 508 can transmit at 100 MHz. Conversely, once the flow associated with computer 508 ends its transmission, that additional bandwidth becomes available, and other flows can take measures to increase their data rates accordingly. In this example, MPS 505 may choose to restore the data rates associated with computers 519-521.

In the interim during which a computer transmits data packets faster than its MPS is allowed to put those data packets onto the loop, data packets are temporarily stored in a buffer within its MPS. In the above example, the data rates associated with computers 519-520 were decreased. Suppose that the effect of these data rate reductions is that computers 519-520 generate packets faster than those packets are now allowed to be put on loop 507 (in order to guarantee the QoS of upstream computer 508). The extra data packets are stored in their respective buffers 522-524. Subsequently, when bandwidth becomes available, the data rates at which MPS 504 can transmit data packets associated with computers 519-521 onto loop 507 is increased. The data packets are pulled from the buffers 522-524 for transmission onto loop 507. In some rare cases, buffers may overflow which results in packet loss. It should be noted that, technically, all data packets are first buffered in the first-in-first-out (FIFO) buffers before being put on the loop.

The RMS is basically a computer system coupled to one of the MPS's which has software processes for setting up the data rates for each of the flows of each of the MPS's on that particular MPTR. It should be noted that each MPS has memory for storing a set of tables which contain information regarding the degree of service for each of the flows. For instance, when a new flow is desired to access the MPTR, the RMS first determines whether there is enough bandwidth to support adding that new flow. The RMS then writes to the tables of each of the MPS's informing them of the criteria (e.g., QoS) for that new flow.

Figure 6:
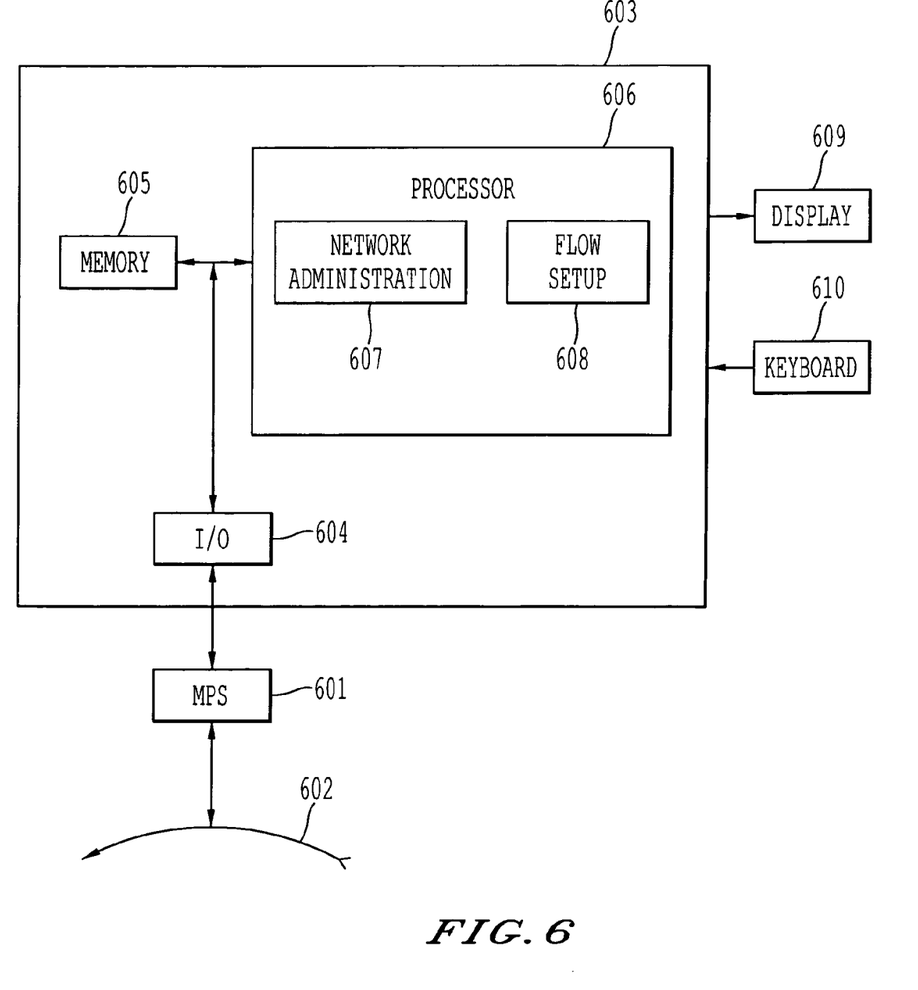
FIG. 6 shows an exemplary computer system which can perform the functions of an RMS.

It is also the function of the RMS to provide network administration and to set up the flows for an MPTR. FIG. 6 shows an exemplary computer system which can perform the functions of an RMS. An MPS 601 is coupled to a segment of the loop 602. The RMS computer system 603 is coupled to MPS 601 via I/O device 604. RMS computer system 603 also contains a block of memory 605 and a processor 606. Memory 605 is used to store network data (e.g., network configuration, QoS settings, historical information, etc.). In addition, software programs pertaining to the functions of the RMS, as described above, are loaded into and stored upon memory 605. The software programs residing in memory 605 cause a network administration process 607 and a flow setup process 608 to run on processor 606. It should be noted that processor 606 may consist of one or more digital signal processors, application specific integrated circuits, microprocessors, etc. The function of the network administration process 607 is to monitor the performance of the network. RMS 600 receives status packets from each of the MPS's via MPS 601. This performance data is rendered out for display on display screen 605. The network administrator has the ability to adjust the QoS of each user on an individual basis by entering commands through a keyboard/mouse input device 610. Thereby, a user can be guaranteed constant bit rate, variable bit rate service with a minimal bandwidth, or a service level agreement.

Once the flows have been set up, if there is additional bandwidth which becomes available, then the extra unused bandwidth is allocated according to a pre-determined weighting scheme by the MPS's. It should be noted that there exist a number of different ways by which bandwidth can be allocated. Some bandwidth allocation schemes include weighted fair queue, per-flow queue, deficit round robin, etc. A novel weighted fair virtual queuing scheme is described in the patent application entitled, "A Method And System For Weighted Fair Flow Control In An Asynchronous Metro Packet Transport Ring Network", filed on Jul. 6, 2000, application Ser. No. 09/611,180 assigned to the assignee of the present invention, which is incorporated in its entirety herein.

In conclusion, the present MPTR invention described above was designed from the ground up with the intention of carrying packetized data as efficiently as possible, whereas prior art networking schemes were primarily designed to carry voice traffic but were subsequently adapted to carry data. It should be noted that the foregoing descriptions of specific embodiments of the present invention have been presented for purposes of illustration and description. They are not intended to be exhaustive or to limit the invention to the precise forms disclosed, and obviously many modifications and variations are possible in light of the above teaching. For instance, other equipment (e.g., amplifiers, filters, repeaters, electro-optical devices, testing/measurement equipment, etc.) can be added to the MPTR and other software processes can be programmed to run on the MPTR. The embodiments described above were chosen in order to best explain the principles of the invention and its practical application, to thereby enable others skilled in the art to best utilize the invention and various embodiments with various modifications as are suited to the particular use are contemplated. It is intended that the scope of the invention be defined by the claims appended hereto and their equivalents.

What is claimed is:

1. A metropolitan area packet ring, comprising: a fiber optic loop carrying asynchronous data packets, wherein the asynchronous data packets flow in one direction through the fiber optic loop; a plurality of metropolitan packet switches coupled to the fiber optic loop, wherein a metropolitan packet switch is comprised of: an I/O port coupled to the fiber optic loop which inserts packets of data onto the fiber optic loop and which pulls packets of data off the fiber optic loop; a processor coupled to the I/O port which separately regulates data packets transmitted over the fiber optic loop on a per-flow basis, and one or more devices to determine packetized data congestion corresponding to particular segments of the metropolitan area packet ring and to adjust flows upstream of a point of congestion.

2. The metropolitan area packet ring of claim 1, wherein the processor regulates data rates to guarantee quality of service on a per-flow basis.

3. The metropolitan area packet ring of claim 2, wherein the quality of service includes a variable bit rate with a minimum bandwidth.

4. The metropolitan area packet ring of claim 3, wherein the quality of service includes a constant bit rate with a minimum delay.

5. The metropolitan area packet ring of claim 1, wherein the processor controls data rates by which upstream flows are allowed to insert data packets onto the fiber optic loop.

6. The metropolitan area packet ring of claim 1, wherein if bandwidth becomes available, the processor re-allocates available bandwidth amongst a plurality of flows.

7. The metropolitan area packet ring of claim 3, further comprising a ring management system which initially assigns rate information for each of the flows.

8. The metropolitan area packet ring of claim 1, wherein the data packets transmitted through the fiber loop comprise Ethernet packets.

9. The metropolitan area packet ring of claim 8, wherein the Ethernet packets comprise 10 Gbit Ethernet.

10. The metropolitan area packet ring of claim 1 further comprising another fiber optic ring, wherein data packets flow in different directions through the two fiber optic rings.

11. In a metropolitan area packet ring having a plurality of switching devices through which a plurality of devices are coupled to the metropolitan area packet ring, a method for managing packetized traffic flowing asynchronously through the metropolitan area packet ring, comprising the steps of: inserting packets onto the metropolitan area packet ring; removing packets from the metropolitan area packet ring; controlling rates by which the packets are allowed to be inserted onto the packet ring on a per-flow basis ; and determining packetized data congestion corresponding to particular segments of the metropolitan area packet ring; and adjusting flows upstream of a point of congestion in order to guarantee that quality of service is being met.

12. The method of claim 11 further comprising the step of guaranteeing quality of service on a per-flow basis.

13. The method of claim 12, wherein the quality of service includes a variable bit rate with a minimum bandwidth.

14. The method of claim 12, wherein the quality of service includes a constant bit rate with a minimum delay.

15. The method of claim 11 further including the steps of determining packetized data congestion corresponding to particular segments of the metropolitan area packet ring; adjusting flows upstream of a point of congestion in order to guarantee that quality of service is being met.

16. The method of claim 11 further comprising the step of allocating available bandwidth to flows according to a predetermined scheme.

17. The method of claim 11, wherein the packetized data flowing through the fiber optic loop is comprised of Ethernet packets.

18. The method of claim 17, wherein the fiber optic loop is comprised of 10 Gbit Ethernet.

19. A device for controlling packetized data in a packet ring, comprising: a first port used to insert data packets onto the packet ring; a second port for taking data packets off from the packet ring; a processor coupled to the first port which controls data packets flowing asynchronously through the packet ring, wherein the processor controls a rate by which data packets are allowed to be inserted onto the packet ring by determining packetized data congestion corresponding to particular segments of the metropolitan area packet ring; and causing flows upstream of a point of congestion to be adjusted in order to guarantee that quality of service is being met.

20. The device of claim 19, wherein rates by which data packets are allowed to be inserted onto the packet ring are controlled on a per-flow basis.

21. The device of claim 19, wherein the processor adjusts the rates such that quality of service is guaranteed.

22. The device of claim 21, wherein quality of service includes a variable bit rate with a minimum bandwidth.

23. The device of claim 21, wherein quality of service includes a constant bit rate with a minimum delay.

24. The device of claim 21, wherein quality of service is guaranteed by decreasing a data rate by which an upstream flow is allowed to insert its data packets onto the packet ring.

25. The device of claim 19, wherein if bandwidth on the packet ring becomes available, the processor allocates available bandwidth on a per-flow basis.

26. The device of claim 19, wherein the packet ring is comprised of a fiber loop.

* * * * *